United States Patent
Long

(10) Patent No.: US 9,408,211 B2
(45) Date of Patent: Aug. 2, 2016

(54) METHOD AND APPARATUS FOR RESOURCE MANAGEMENT, LOW-BANDWIDTH USER EQUIPMENT, AND USER EQUIPMENT

(71) Applicant: Huawei Device Co., Ltd., Shenzhen (CN)

(72) Inventor: Shuiping Long, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 220 days.

(21) Appl. No.: 14/282,161

(22) Filed: May 20, 2014

(65) Prior Publication Data

US 2014/0254438 A1    Sep. 11, 2014

Related U.S. Application Data

(63) Continuation of application No. PCT/CN2012/075382, filed on May 11, 2012.

(51) Int. Cl.
*H04W 28/20* (2009.01)
*H04W 72/04* (2009.01)
(Continued)

(52) U.S. Cl.
CPC ............. *H04W 72/0453* (2013.01); *H04L 5/14* (2013.01); *H04W 4/005* (2013.01); *H04W 28/20* (2013.01); *H04W 72/02* (2013.01); *H04W 72/042* (2013.01); *H04W 72/048* (2013.01)

(58) Field of Classification Search
CPC ... H04W 28/20; H04W 28/06; H04W 72/042; H04W 72/0453; H04W 72/005; H04L 41/0896
See application file for complete search history.

(56) References Cited

U.S. PATENT DOCUMENTS

| | | | |
|---|---|---|---|
| 8,144,639 B1 * | 3/2012 | Ghaus | H04W 76/048 370/311 |
| 2002/0080816 A1 * | 6/2002 | Spinar | H04W 28/20 370/449 |

(Continued)

FOREIGN PATENT DOCUMENTS

| | | |
|---|---|---|
| CN | 101714892 A | 5/2010 |
| CN | 101164351 B | 4/2011 |

(Continued)

OTHER PUBLICATIONS

Partial English Translation and Abstract of Chinese Patent Application No. CN101164351B, Jun. 20, 2014, 4 pages.
Partial English Translation and Abstract of Chinese Patent Application No. CN102316535A, Part 1, Aug. 4, 2014, 6 pages.
Partial English Translation and Abstract of Chinese Patent Application No. CN102316535, Part 2, Jun. 20, 2014, 42 pages.

(Continued)

*Primary Examiner* — Raj Jain
(74) *Attorney, Agent, or Firm* — Conley Rose P.C.; Grant Rodolph

(57) ABSTRACT

A method and an apparatus for resource management, and a low-bandwidth user equipment. The method for resource management includes: determining, according to a system downlink transmission bandwidth or according to a system downlink transmission bandwidth and a maximum downlink transmission bandwidth of a low-bandwidth user equipment, a downlink transmission resource configured by a cell for the low-bandwidth user equipment. The method and apparatus for resource management proposed in the present invention are intended to solve a problem that a low-bandwidth user equipment accesses a broadband system, and enable, through resource management, a low-bandwidth user equipment and a common user equipment to coexist on a same frequency band without causing a waste of a dedicated frequency band resource.

23 Claims, 2 Drawing Sheets

(51) Int. Cl.
  *H04L 5/14* (2006.01)
  *H04W 4/00* (2009.01)
  *H04W 72/02* (2009.01)

(56) References Cited

U.S. PATENT DOCUMENTS

| | | | |
|---|---|---|---|
| 2002/0147019 A1* | 10/2002 | Uhlik | H04W 76/045 455/452.1 |
| 2012/0207103 A1 | 8/2012 | Dai et al. | |
| 2014/0254438 A1* | 9/2014 | Long | H04W 72/0453 370/280 |

FOREIGN PATENT DOCUMENTS

| | | |
|---|---|---|
| CN | 102316535 A | 1/2012 |
| WO | 2010145620 A1 | 12/2010 |

OTHER PUBLICATIONS

Foreign Communication From a Counterpart Application, PCT Application No. PCT/CN20121075382, English Translation of International Search Report dated Feb. 7, 2013, 4 pages.

Foreign Communication From a Counterpart Application, PCT Application No. PCT/CN20121075382, Written Opinion dated Feb. 7, 2013, 7 pages.

"3rd Generation Partnership Project; Technical Specification Group Radio Access Network; Evolved Universal Terrestrial Radio Access (E-UTRA); Physical Layer Procedures (Release 10)," 3GPP TS 36.213, V10.9.0, Technical Specification, Feb. 2013, 126 pages.

Foreign Communication From a Counterpart Application, Chinese Application No. 201280000362.X, Chinese Office Action, Jun. 5, 2014, 7 pages.

Foreign Communication From a Counterpart Application, Chinese Application No. 201280000362.X, Chinese Search Report, May 27, 2014, 2 pages.

* cited by examiner

METHOD AND APPARATUS FOR RESOURCE MANAGEMENT, LOW-BANDWIDTH USER EQUIPMENT, AND USER EQUIPMENT

CROSS-REFERENCE TO RELATED APPLICATIONS

This application is a continuation of International Application No. PCT/CN2012/075382, filed on May 11, 2012, which is hereby incorporated by reference in its entirety.

TECHNICAL FIELD

The present invention relates to the field of communications, and in particular, to a method and an apparatus for resource management, a common user equipment, and a low-bandwidth user equipment (UE).

BACKGROUND

The concept of the Internet of Things was first proposed in 1999. The definition is very simple, that is, connecting all things to the Internet by using an information sensing device, so as to implement intelligent identification and management.

According to an existing standard definition, an information sensing device applied to the Internet of Things includes an apparatus such as a radio frequency identification apparatus, an infrared sensor, a global positioning system, and a laser scanner. They are combined with the Internet, which can implement remote sensing and control over all things (for example, buildings, goods, climates, machines, and human beings), thereby forming a more intelligent production and living system. It is larger than the existing Internet and is widely applied to multiple fields such as intelligent traffic, environment protection, government operation, common security, intelligent home, intelligent firefighting, industrial monitoring, senior health care, and personal health.

It is generally considered that a first phase of the Internet of Things is referred to as machine to machine (M2M). That is, free communications between machines is implemented. For a communications network (for example, a mobile cellular network), this type of communications service undertaken by the communications network is referred to as machine type communication (MTC).

However, large-scale M2M/MTC development requires several prerequisites, one of which is reduction of a terminal (communications module) cost. Therefore, the 3rd Generation Partnership Project (3GPP) proposes a low-cost low-bandwidth UE which supports only a low system channel bandwidth (for example, 1.4 megahertz (MHz) or 3 MHz), or in other words, supports only a low system downlink transmission bandwidth (for example, six resource blocks (RB), or 15 RBs). Because only a low bandwidth is considered during product design and a problem of accessing an LTE system of 20 MHz or 100 RBs does not need to be considered, a terminal cost can be greatly reduced. In addition, if a low-bandwidth UE solution is applied to an LTE system, migration of an existing M2M application that is deployed on a Global System for Mobile communications (GSM)/General Packet Radio Service (GPRS) system/network to a long term evolution (LTE) system is facilitated, so that an operator can re-develop a frequency band of an existing GSM or GPRS system. It should be noted that a low-bandwidth user equipment (UE) may be an MTC UE or may be a UE of another application. The low-bandwidth UE supports only a low bandwidth, which may be for downlink (communication from a base station to a UE) or uplink (communication from a UE to a base station), or only a low bandwidth is supported both uplink and downlink.

As a result, a problem of how to enable a low-bandwidth UE to access a broadband (for example, 10 MHz) system and a problem of how to enable a low-bandwidth UE and a common UE to coexist in a same system are involved.

SUMMARY

The present invention proposes a method and an apparatus for resource management so as to solve the problem of how to enable a low-bandwidth UE to access a broadband system.

According to one aspect, a method for resource management is proposed and includes: determining, according to a system downlink transmission bandwidth or according to a system downlink transmission bandwidth and a maximum downlink transmission bandwidth of a low-bandwidth UE, a downlink transmission resource configured by a cell for the low-bandwidth UE.

According to another aspect, a method for resource management is proposed and includes: determining, according to a resource configured by a cell for a low-bandwidth UE, a resource that is configured or scheduled by the cell for a common UE itself and used for transmitting downlink control information or data information; and obtaining the downlink control information or the data information according to the resource used for transmitting the downlink control information or the data information.

According to another aspect, an apparatus for resource management is proposed and includes a first determining unit configured to determine, according to a system downlink transmission bandwidth or according to a system downlink transmission bandwidth and a maximum downlink transmission bandwidth of a low-bandwidth UE, a downlink transmission resource configured by a cell for the low-bandwidth UE.

According to another aspect, a low-bandwidth UE is proposed and includes the foregoing apparatus for resource management.

According to another aspect, a common UE is proposed and includes: a resource determining unit configured to determine, according to a resource configured by a cell for a low-bandwidth UE, a resource that is configured or scheduled by the cell for a common UE itself and used for transmitting downlink control information or data information; and an obtaining unit configured to obtain the downlink control information or the data information according to the resource used for transmitting the downlink control information or the data information.

In embodiments of the present invention, by performing resource management, a low-bandwidth UE and a common UE are enabled to coexist on a same frequency band without causing a waste of a dedicated MTC frequency band resource.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to a variety of communications systems, for example, GSM, a code division multiple access (CDMA) system, a wideband code division multiple access (WCDMA) system, a GPRS system, and a LTE system.

A UE may also be referred to as a mobile terminal, a mobile station, or the like, and may communicate with one or more core networks through a radio access network (for example, RAN, GERAN). The UE exchanges voice and/or data with the radio access network.

A base station may be a base transceiver station (BTS or Base Station) in GSM or CDMA, may be a NodeB in WCDMA, or may be an evolved nodeB (eNB or e-NodeB) in LTE. In addition, one base station may support/manage one or more cells (cell), and when a UE needs to communicate with a network, it may select one cell to initiate network access.

The following describes a specific embodiment for resource management according to an embodiment of the present invention by using an LTE network as an example. Generally, a channel bandwidth of an LTE system or a network may be 1.4 MHz, 3 MHz, 5 MHz, 10 MHz, 20 MHz, or the like, and corresponding system downlink transmission bandwidths are respectively 6, 15, 25, 50, 100 resource blocks (RB), or the like. If a system downlink transmission bandwidth is an odd number of RBs, one RB is at a central position of a system. If a system downlink transmission bandwidth is an even number of RBs, an integer number of RBs are available on two sides of a central position of a system. In addition, in downlink, there is one special subcarrier at the central position of the system, which is referred to as a direct current subcarrier (Subcarrier). This special subcarrier is not used to transmit any data information or control information or physical layer auxiliary information, and does not belong to any one RB. One RB always has 12 available subcarriers. It should be noted that in an LTE system, system bandwidths for downlink and uplink may be different. In the present invention, an issue related to a downlink transmission bandwidth is mainly discussed.

Figure 1:
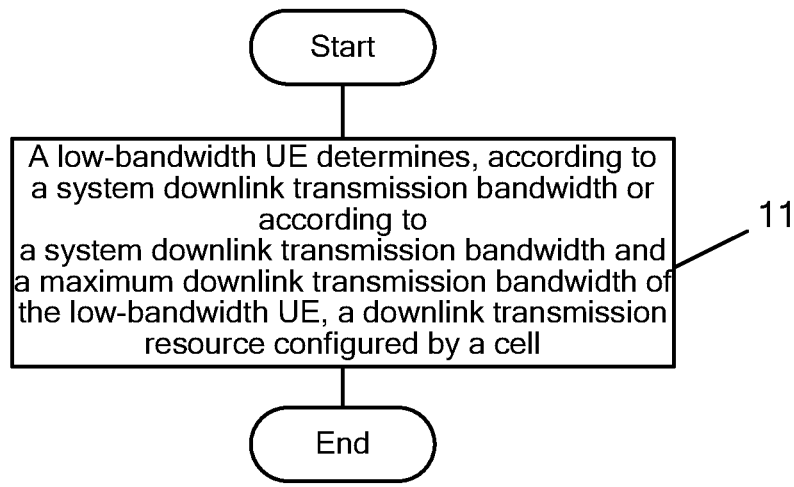
FIG. 1 is a flowchart of a method for resource management on a low-bandwidth UE side according to an embodiment of the present invention.

The following describes a method for resource management according to an embodiment of the present invention with reference to FIG. 1, where the method is implemented on a low-bandwidth UE side. A step is described as follows:

11. A low-bandwidth UE determines, according to a system downlink transmission bandwidth or according to a system downlink transmission bandwidth and a maximum downlink transmission bandwidth of the low-bandwidth UE, a downlink transmission resource configured by a cell.

The maximum downlink transmission bandwidth of the low-bandwidth UE herein may be fixed or may be variable, where the maximum downlink transmission bandwidth of the low-bandwidth UE may be determined according to the system downlink transmission bandwidth. For example, the low-bandwidth UE may determine, in a table lookup manner and according to the system downlink transmission bandwidth, the maximum downlink transmission bandwidth configured by the cell for the low-bandwidth UE.

In one embodiment, a low-bandwidth UE first sets a maximum downlink transmission bandwidth of the low-bandwidth UE. In such a case, the maximum downlink transmission bandwidth of the low-bandwidth UE is fixed regardless of a value of a current system downlink transmission bandwidth.

If the set maximum downlink transmission bandwidth is greater than or equal to the current system downlink transmission bandwidth, the low-bandwidth UE may work as a common UE, and use all resources of the system downlink transmission bandwidth together with other common UEs. However, when the set maximum downlink transmission bandwidth is smaller than the system downlink transmission bandwidth, the low-bandwidth UE may determine that a downlink transmission resource configured by a cell is a resource of a central part of the system downlink transmission bandwidth. Therefore, the low-bandwidth UE may use this resource to receive and obtain a system broadcast message, a system synchronization signal, downlink control information, downlink data, or the like. However, this does not mean that when the cell schedules a resource, this resource is definitely scheduled to the low-bandwidth UE for use; and this resource is also possible to be scheduled to a common UE for use, or this resource is also possible not to be used actually. System resources are classified in two dimensions herein. In a frequency dimension, the system resources are classified as a certain number of subcarriers. In a time dimension, the system resources are classified as orthogonal frequency division multiplexing (OFDM) symbols. Generally, one RB includes 12 subcarriers, and includes six or seven OFDM symbols.

Specifically, when the set maximum downlink transmission bandwidth is an odd number of RBs and the system downlink transmission bandwidth is an odd number of RBs, or the set maximum downlink transmission bandwidth is an even number of RBs and the system downlink transmission bandwidth is an even number of RBs, the low-bandwidth UE may determine that the resource of the central part of the system downlink transmission bandwidth is configured for the low-bandwidth UE, where the number of RBs occupied by the resource of the central part of the system downlink transmission bandwidth is equal to the number of RBs of the maximum downlink transmission bandwidth.

Alternatively, when the set maximum downlink transmission bandwidth is an odd number of RBs and the system downlink transmission bandwidth is an even number of RBs, or the set maximum downlink transmission bandwidth is an even number of RBs and the system downlink transmission bandwidth is an odd number of RBs, that is, parity of the number of RBs of the maximum downlink transmission bandwidth and parity of the number of RBs of the system downlink transmission bandwidth are inconsistent, the low-bandwidth UE still determines that the resource of the central part of the system downlink transmission bandwidth is configured for the low-bandwidth UE, where the number of subcarriers occupied by the central part of the system downlink transmission bandwidth is equal to the number of subcarriers of the maximum downlink transmission bandwidth, and two sides (that is, edge parts) of the resource of the central part of the system downlink transmission bandwidth are both a half RB. Alternatively, in order to avoid a problem of a half RB (it should be noted that existing resource assignment in an LTE system is performed in the unit of RB), the low-bandwidth UE still determines that the resource of the central part of the system downlink transmission bandwidth is configured for the low-bandwidth UE, but in such a case, the number of RBs occupied by the resource of the central part of the system downlink transmission bandwidth is one more than the number of RBs of the maximum downlink transmission bandwidth. It should be noted that in the embodiment, after one RB is added on the basis of the maximum downlink transmission bandwidth, a sum is still smaller than the number of RBs of the current system downlink transmission bandwidth.

In other words, the low-bandwidth UE first sets the maximum downlink transmission bandwidth, and then determines, according to the current system downlink transmission bandwidth and the maximum downlink transmission bandwidth, the downlink transmission resource configured by the cell, where the resource configured for the low-bandwidth UE may be equal to or greater than the maximum downlink transmission bandwidth.

In another embodiment, a low-bandwidth UE first selects a constant, N, and determines a maximum downlink transmission bandwidth of the low-bandwidth UE according to the constant N and a system downlink transmission bandwidth, where N is a positive integer. For example, when N is an odd number and the system downlink transmission bandwidth is an odd number of RBs, or N is an even number and the system downlink transmission bandwidth is an even number of RBs, that is, parity of the number of RBs of the maximum downlink transmission bandwidth and parity of the number of RBs of the system downlink transmission bandwidth are consistent, the low-bandwidth UE sets the maximum downlink transmission bandwidth to N RBs. Otherwise, when N is an odd number and the system downlink transmission bandwidth is an even number of RBs, or N is an even number and the system downlink transmission bandwidth is an odd number of RBs, that is, parity of the number of RBs of the maximum downlink transmission bandwidth and parity of the number of RBs of the system downlink transmission bandwidth are inconsistent, the low-bandwidth UE sets the maximum downlink transmission bandwidth to (N+1) RBs. It can be seen from the foregoing that, in this solution, the maximum downlink transmission bandwidth of the low-bandwidth UE is variable.

When the maximum downlink transmission bandwidth of the low-bandwidth UE is smaller than the system downlink transmission bandwidth, the low-bandwidth UE may determine that a cell configures a resource of a central part of the system downlink transmission bandwidth for the low-bandwidth UE, where the number of RBs occupied by the resource of the central part of the system downlink transmission bandwidth is equal to the number of RBs of the maximum downlink transmission bandwidth of the low-bandwidth UE.

In other words, the low-bandwidth UE first selects a constant N, and then determines, according to the system downlink transmission bandwidth and parity of N and parity of the system downlink transmission bandwidth, the maximum downlink transmission bandwidth of the low-bandwidth UE. That is, the maximum downlink transmission bandwidth is variable, for example, may be determined based on a current system downlink transmission bandwidth. Alternatively, the low-bandwidth UE determines, by means of table lookup, the maximum downlink transmission bandwidth of the low-bandwidth UE, where the maximum downlink transmission bandwidth corresponds to the current system downlink transmission bandwidth. Finally, the low-bandwidth UE directly determines, according to the determined maximum downlink transmission bandwidth, a downlink transmission resource configured by the cell. It should be noted that this embodiment is, in essence, the same as the solution of the foregoing embodiment in which the resource eventually configured by the cell for the low-bandwidth UE is determined according to a parity relationship between a system downlink transmission bandwidth and a fixed maximum downlink transmission bandwidth, and a difference lies merely in an implementation manner.

A difference between the foregoing two embodiments lies in whether the maximum downlink transmission bandwidth of the low-bandwidth UE is fixed in advance. Then, a base station (or a cell) may configure an available downlink transmission resource for the low-bandwidth UE according to the maximum downlink transmission bandwidth and the system downlink transmission bandwidth.

In another embodiment, a low-bandwidth UE may find, directly by means of table lookup according to a system downlink transmission bandwidth, that a central part of the system downlink transmission bandwidth is a resource (that is, the number of RBs or the number of subcarriers) that can be configured by a cell. In other words, directly by means of table lookup, the low-bandwidth UE may determine, according to the system downlink transmission bandwidth, a downlink transmission resource configured by the cell. Alternatively, directly by means of table lookup, the low-bandwidth UE may determine, according to the system downlink transmission bandwidth and a maximum downlink transmission bandwidth of the low-bandwidth UE, a downlink transmission resource configured by the cell.

It can be seen from the foregoing that, with the method for resource management on the low-bandwidth UE side according to the embodiment of the present invention, a low-bandwidth UE and a common UE can coexist on a same frequency band, and it is unnecessary to set a dedicated frequency band resource for the low-bandwidth UE. Therefore, no waste of a dedicated frequency band resource is caused. It should be understood that a resource configured for the low-bandwidth UE refers to a maximum downlink transmission resource that may be used by the low-bandwidth UE, and it is also possible for the common UE to receive downlink control information or data information by using this resource.

After configuring a downlink transmission resource for the low-bandwidth UE, the cell may configure all or a part of the resource for a search space, where the search space is used to transmit downlink control information. Generally, a search space is classified as a common search space (CSS) and/or a UE-specific search space (USS). In this embodiment, a base station (or a cell) configures a CSS and/or USS resource for the low-bandwidth UE.

For example, the base station (or the cell) may indicate, according to a cell identifier (Cell ID), a resource configured for the CSS; or indicate, according to a UE identifier, a resource configured for the USS, or indicate, by sending a random access response (RAR) message to the low-bandwidth UE, a resource configured for the USS. The low-bandwidth UE or the common UE performs blind detection on downlink control information by using the resource configured by the base station (or the cell) for the search space. The blind detection means trying multiple possible conditions, and if the detection is not successful, it is considered that the base station does not configure the CSS and the USS.

The resource configured by the cell, in addition to carrying the downlink control information, may further transmit other information such as a physical broadcast channel and a system synchronization signal. Specially, in a specific subframe (for example, a subframe 0, a subframe 1, a subframe 5, or a subframe 6), a physical broadcast channel and/or a system synchronization signal may occupy many resource elements (RE), which causes that a resource for bearing the downlink control information is insufficient; and the base station (or the cell) may use a different resource configuration based on a subframe number. In addition, in a different system operating mode, a synchronization signal on these special subframes occupies a resource element in a different manner, and a different resource configuration may also be used based on a system operating mode. It should be noted that, for a specific subframe, if RE insufficiency does not exceed a threshold (for example, 100 REs), a resource configuration may also not be adjusted, and channel coding and decoding may confront RE insufficiency to a certain extent, so that the low-bandwidth UE or the common UE correctly receives and obtains the downlink control information. The system operating mode herein includes a frequency-division duplexing (FDD) mode and a time-division duplexing (TDD) mode.

With the foregoing method for resource management according to the embodiment of the present invention, multiple aspects of problems that may occur when a low-bandwidth UE accesses a broadband system can be solved.

Figure 2:
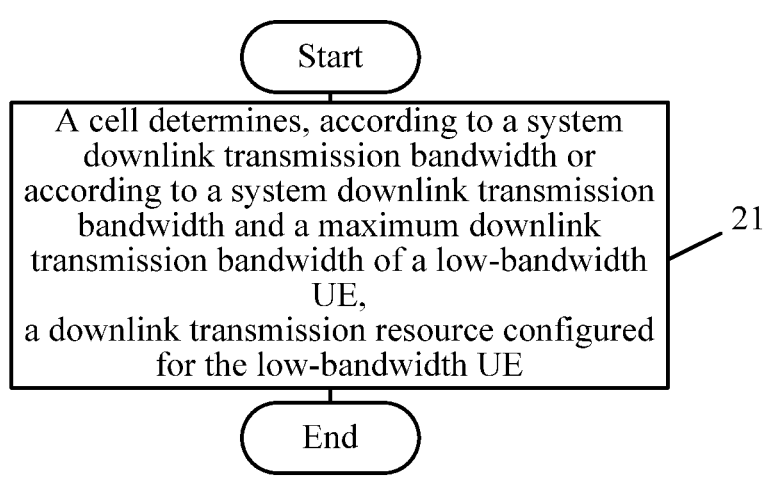
FIG. 2 is a flowchart of a method for resource management on a network side according to an embodiment of the present invention.

The following describes a method for resource management according to an embodiment of the present invention with reference to FIG. 2, where the method is implemented on a network side. The method on the network side corresponds to the method on the low-bandwidth UE side. For brevity of description, the same content as that in the foregoing method is not described repeatedly.

21. A cell determines, according to a system downlink transmission bandwidth or according to a system downlink transmission bandwidth and a maximum downlink transmission bandwidth of a low-bandwidth UE, a downlink transmission resource configured for the low-bandwidth UE.

In a case in which the maximum downlink transmission bandwidth is fixed, the cell first sets the maximum downlink transmission bandwidth, and then determines, according to the system downlink transmission bandwidth and the maximum downlink transmission bandwidth, the downlink transmission resource configured for the low-bandwidth UE.

Specifically, when the maximum downlink transmission bandwidth is greater than or equal to the system downlink transmission bandwidth, in such a case, the low-bandwidth UE works as a common UE; that is, a downlink transmission resource that is separately configured by the cell for the low-bandwidth UE does not exist. However, when the maximum downlink transmission bandwidth is smaller than the system downlink transmission bandwidth, the cell determines that the downlink transmission resource configured for the low-bandwidth UE is a resource of a central part of the system downlink transmission bandwidth.

For example, when the maximum downlink transmission bandwidth is smaller than the system downlink transmission bandwidth, and the maximum downlink transmission bandwidth is an odd number of RBs and the system downlink transmission bandwidth is an odd number of RBs, or the maximum downlink transmission bandwidth is an even number of RBs and the system downlink transmission bandwidth is an even number of RBs, the cell determines that the downlink transmission resource configured for the low-bandwidth UE is the resource of the central part of the system downlink transmission bandwidth, where the number of RBs occupied by the resource of the central part of the system downlink transmission bandwidth is equal to the number of RBs of the maximum downlink transmission bandwidth.

For example, when the maximum downlink transmission bandwidth is smaller than the system downlink transmission bandwidth, and the maximum downlink transmission bandwidth is an odd number of RBs and the system downlink transmission bandwidth is an even number of RBs, or the maximum downlink transmission bandwidth is an even number of RBs and the system downlink transmission bandwidth is an odd number of RBs, the cell determines that the downlink transmission resource configured for the low-bandwidth UE is the resource of the central part of the system downlink transmission bandwidth, where the number of subcarriers occupied by the resource of the central part of the system downlink transmission bandwidth is equal to the number of subcarriers of the maximum downlink transmission bandwidth, and two sides (that is, edge parts) of the resource of the central part of the system downlink transmission bandwidth are both a half RB.

Alternatively, for example, when the maximum downlink transmission bandwidth is smaller than the system downlink transmission bandwidth, and the maximum downlink transmission bandwidth is an odd number of RBs and the system downlink transmission bandwidth is an even number of RBs, or the maximum downlink transmission bandwidth is an even number of RBs and the system downlink transmission bandwidth is an odd number of RBs, the cell determines that the downlink transmission resource configured for the low-bandwidth UE is the resource of the central part of the system downlink transmission bandwidth, where the number of RBs occupied by the resource of the central part of the system downlink transmission bandwidth is one more than the number of RBs of the maximum downlink transmission bandwidth. It should be noted that in the embodiment, after one RB is added on the basis of the maximum downlink transmission bandwidth, a sum is still smaller than the number of RBs of a current system downlink transmission bandwidth.

In other words, the cell first sets the maximum downlink transmission bandwidth, and then determines, according to the system downlink transmission bandwidth and the maximum downlink transmission bandwidth, the resource configured for the low-bandwidth UE. The resource configured by a network for the low-bandwidth UE may be equal to or greater than the maximum downlink transmission bandwidth.

In addition, in a case in which the maximum downlink transmission bandwidth is variable, the cell first sets a constant N, and then determines the maximum downlink transmission bandwidth according to the constant N and the system downlink transmission bandwidth, where N is a positive integer. When N is an odd number and the system downlink transmission bandwidth is an odd number of RBs, or N is an even number and the system downlink transmission bandwidth is an even number of RBs, the cell sets the maximum downlink transmission bandwidth to N RBs. Alternatively, when N is an odd number and the system downlink transmission bandwidth is an even number of RBs, or N is an even number and the system downlink transmission bandwidth is an odd number of RBs, the cell sets the maximum downlink transmission bandwidth to (N+1) RBs. Therefore, when the maximum downlink transmission bandwidth is smaller than the system downlink transmission bandwidth, the cell determines that the resource configured for the low-bandwidth UE is the resource of the central part of the system downlink transmission bandwidth, where the number of RBs occupied by the resource of the central part of the system downlink transmission bandwidth is equal to the number of RBs of the maximum downlink transmission bandwidth. In this way, a difference between this method and the foregoing method merely lies in that the cell first sets a constant N, and then determines the maximum downlink transmission bandwidth of the low-bandwidth UE according to the system downlink transmission bandwidth and parity of N and parity of the number of RBs of the system downlink transmission bandwidth. Finally, the cell determines that a size of the resource configured for the low-bandwidth UE is the maximum downlink transmission bandwidth. When the maximum downlink transmission bandwidth of the low-bandwidth UE is greater than or equal to the system downlink transmission bandwidth, the cell configures all resources of the system downlink transmission bandwidth for the low-bandwidth UE.

It can be seen from the foregoing that, with the method for resource management according to the embodiment of the present invention, a low-bandwidth UE and a common UE can coexist on a same system frequency band without causing a waste of a dedicated frequency band resource. It should be understood that a resource configured for the low-bandwidth UE refers to a maximum downlink transmission resource that may be used by the low-bandwidth UE, and it is also possible for the common UE to receive downlink control information or data information by using a resource of a system downlink transmission bandwidth.

After a downlink transmission resource configured by a cell for the low-bandwidth UE is determined, a resource configured for a search space may be determined, so as to transmit downlink control information by using the search space.

Because the search space generally includes a CSS and/or a USS, the cell may indicate, according to a cell identifier, a resource configured for the CSS, or indicate, according to a UE identifier, a resource configured by the cell for the USS, or indicate, by using a RAR message, a resource configured by the cell for the USS.

It should be understood that in a specific subframe (for example, a subframe 0, a subframe 1, a subframe 5, or a subframe 6), a system broadcast message or a system synchronization message may occupy many resources (that is, resource elements, RE), which causes that a resource for bearing the downlink control information is insufficient. Therefore, the cell needs to determine an actual resource configuration based on a subframe number and/or a system operating mode (a FDD mode or a TDD mode).

With the foregoing method for resource management according to the embodiment of the present invention, multiple aspects of problems that may occur when a low-bandwidth UE accesses a broadband system can be solved.

Figure 3:
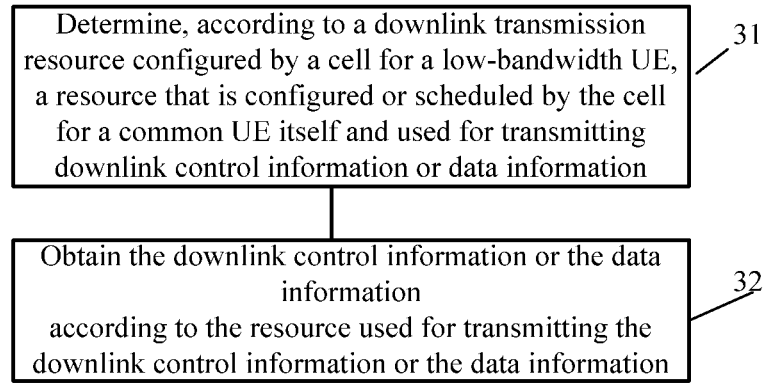
FIG. 3 is a flowchart of a method for resource management on a common UE side according to an embodiment of the present invention.

The following describes a method for resource management according to an embodiment of the present invention with reference to FIG. 3, where the method is implemented on a common UE side. Steps are as follows:

31. A common UE determines, according to a downlink transmission resource configured by a cell for a low-bandwidth UE, a resource that is configured or scheduled by the cell for the common UE itself and used for transmitting downlink control information or data information.

32. The common UE obtains the downlink control information or the data information according to the resource used for transmitting the downlink control information or the data information.

If two sides of the downlink transmission resource configured by the cell for the low-bandwidth UE each are a half RB, the common UE determines that the resource that is configured by the cell for the common UE itself and used for transmitting the downlink control information or the data information includes a special RB, and a half RB of the special RB has been configured for the low-bandwidth UE. Accordingly, the common UE obtains the downlink control information or the data information by using a half RB that is not configured for the low-bandwidth UE in the special RB. It should be noted that the cell may also configure or schedule another common RB for the common UE.

Alternatively, if two sides of the downlink transmission resource configured by the cell for the low-bandwidth UE each are a half RB, the common UE determines that the resource configured by the cell for the common UE itself and used for transmitting the downlink control information or the data information includes at least one special RB, and a half RB of the special RB has been configured for the low-bandwidth UE. Accordingly, the common UE obtains the downlink control information or the data information by combining half RBs that are not configured for the low-bandwidth UE in two of the special RBs. It should be noted that the cell may also configure or schedule another common RB for the common UE.

Alternatively, if two sides of the resource configured by the cell for the low-bandwidth UE each are a half RB, the common UE determines that the resource configured or scheduled by the cell for the common UE itself and used for transmitting the downlink control information or the data information includes a special RB having the half RB and one or more RBs that are connected to the special RB and configured for the low-bandwidth UE. Accordingly, the common UE obtains the downlink control information or the data information by using the entire special RB. It should be noted that the cell may also configure or schedule another common RB for the common UE.

It can be seen from the foregoing that, with the method for resource management on the common UE side according to the embodiment of the present invention, a low-bandwidth UE and a common UE can coexist on a same frequency band, and it is unnecessary to set a dedicated frequency band resource for the low-bandwidth UE. Therefore, no waste of a dedicated frequency band resource is caused.

With the foregoing method for resource management according to the embodiment of the present invention, multiple aspects of problems that may occur to a common UE when a low-bandwidth UE accesses a broadband system can be solved.

The following describes in detail the method for resource management according to an embodiment of the present invention by using a specific embodiment, in which an MTC UE is used as an example.

For example, if a maximum downlink transmission bandwidth assigned by an LTE system to an MTC UE is an even number of RBs, but a system downlink transmission bandwidth is an odd number of RBs, two sides of an RB resource occupied by the MTC UE, in addition to an odd number of RBs located in a center of the system downlink transmission bandwidth, each occupy a half RB, where an RB where the half RB is located is a special RB. Similarly, if a maximum downlink transmission bandwidth assigned by an LTE system to an MTC UE is an odd number of RBs, but a system downlink transmission bandwidth is an even number of RBs, two sides of an RB resource occupied by the MTC UE, in addition to an even number of RBs in a center of the system downlink transmission bandwidth, each still occupy a half RB. However, the half RB on each of the two sides of the RB resource occupied by the MTC UE cannot be used by a common UE because downlink resource assignment of the LTE system is performed in the unit of RB.

Specifically, the maximum downlink transmission bandwidth of the MTC UE may be set to 6 RBs or 15 RBs, and the system downlink transmission bandwidth may be 15, 25, 50, 100 RBs, or the like. The following describes, by using an example that the maximum downlink transmission bandwidth of the MTC UE is an even number of RBs (for example, 6 RBs) and the system downlink transmission bandwidth is an odd number of RBs (for example, 25 RBs), how a common UE uses a transmission resource of a half RB in a case in which a transmission bandwidth assigned to the MTC UE has a half RB. Similarly, when the maximum downlink transmission bandwidth of the MTC UE is an odd number of RBs and the system downlink transmission bandwidth is an even number of RBs, a processing manner is the same as the foregoing.

Generally, if a characteristic of supporting an MTC UE is released in a certain version of the Third Generation Partnership Project (3GPP), it may be considered that a common UE according to this version or a later version can support a case in which a half RB is used. In other words, when the common UE is configured with the foregoing special RB (where a half RB exists), a base station (for example, an eNB), when transmitting data or control information, uses only a resource of a half RB that is not configured for the MTC UE in the special RB, and the common UE also parses the data or the control information by using only the half RB. A common UE earlier than this version needs to be upgraded; otherwise, it is possible that the resource of the half RB cannot be used. Alternatively, if a base station (or a cell) assigns one of the foregoing two special RBs to the common UE, the base station (or the cell) assigns the two special RBs to the common UE by default, and the common UE may use a resource to perform data or control information transmission, where the resource is not configured for the MTC UE in a combination of the two special RBs. In other words, the common UE combines two half RBs that are not configured for the MTC UE in the two special RBs to make, in a virtual manner, one RB for use.

Another case also exists. When the common UE is assigned the foregoing special RB and one or more RBs that are connected to the foregoing special RB and can be occupied by the MTC UE, it indicates that the special RB and the one or more RBs that are connected to the special RB and can be occupied by the MTC UE are not actually used by the MTC UE to transmit data or control information. Therefore, a base station (or a cell) may allocate these RBs for the common UE, and the common UE uses these RBs to transmit data or control information.

Optionally, when parity of RBs of the system downlink transmission bandwidth and parity of RBs of the transmission bandwidth of the MTC UE are inconsistent, a base station (or a cell) assigns one more RB to the MTC UE by default. In such a case, the MTC UE also needs to determine, according to the system downlink transmission bandwidth, a transmission bandwidth that is actually assigned, and perform corresponding receiving processing.

After configuring a downlink transmission resource for the MTC UE, the base station (or the cell) may carry information to be sent to the MTC UE or the common UE in these resources.

Generally, the base station (or the cell) may use a cell identifier (cell ID) to indicate a position of a CSS resource. In addition, the base station (or the cell) may indicate, by using a user equipment identifier (UE ID) (for example, a cell radio network temporary identifier (C-RNTI) and an international mobile subscriber identification number (IMSI)), a resource configured for a USS for mapping the USS. Alternatively, the base station indicates, by using a RAR message, a resource that is configured for a USS for mapping the USS.

It should be understood that the resource for mapping the USS and a resource for mapping the CSS may be overlapping, and resources that are used to map USSs of UEs may also be overlapping.

In a case in which a half RB exists, for the convenience of the MTC UE to locate a position of a resource configured by the cell for a search space or a position of a resource scheduled by the cell for the MTC UE, the base station (or the cell) may re-number the resource configured for the MTC UE. For example, every 12 subcarriers from a low frequency to a high frequency of the resource are numbered as one new RB, and in this way, an integer number of new RBs (for example, a new RB1, RB2, RB3, RB4, RB5, and RB6) may be obtained.

In order to avoid interference between cells, a position configured for a resource of a search space of each cell may be made different. For example, for a cell where cell ID mod 3=0, the base station configures a resource for a CSS by using the RB1, the RB2, the RB3, and the RB4 for mapping the CSS; for a cell where cell ID mod 3=1, the base station configures a resource for a CSS by using the RB3, the RB4, the RB5, and the RB6 for mapping the CSS; and for a cell where cell ID mod 3=2, the base station configures a resource for a CSS by using the RB1, the RB2, the RB5, and the RB6 for mapping the CSS.

In addition, for some special subframes, a resource that can be actually used among resources for an MTC UE to transmit downlink control information decreases greatly. For example, in a subframe 0, a physical broadcast channel (PBCH) needs to be transmitted on 72 subcarriers in a center, and four orthogonal frequency division multiplexing (OFDM) symbols are used in a time domain. For frequency division duplexing (FDD), two last OFDM symbols in a timeslot 0 of a subframe 0 and a subframe 5 are used to transmit a synchronization signal, which occupies 72 subcarriers in the center. For time division duplexing (TDD), one last OFDM symbol of a subframe 0 and a subframe 5 and a third OFDM symbol of a subframe 1 and a subframe 6 are used to transmit a synchronization signal, which occupies 72 subcarriers in the center.

The base station may use different CSS and USS resource configurations for these special subframes. For example, in the subframe 0, the base station configures six RBs to map a USS, and in the subframe 5, the base station configures five RBs to map a CSS. For another example, in the subframe 0, the base station configures six RBs to map a CSS, and in the subframe 5, the base station configures five RBs to map a USS.

It can be seen from the foregoing that, with the method for resource management according to the embodiment of the present invention, a low-bandwidth UE and a common UE can coexist on a same frequency band, and it is unnecessary to set a dedicated frequency band resource for the low-bandwidth UE. Therefore, no waste of a dedicated frequency band resource is caused.

Figure 4:
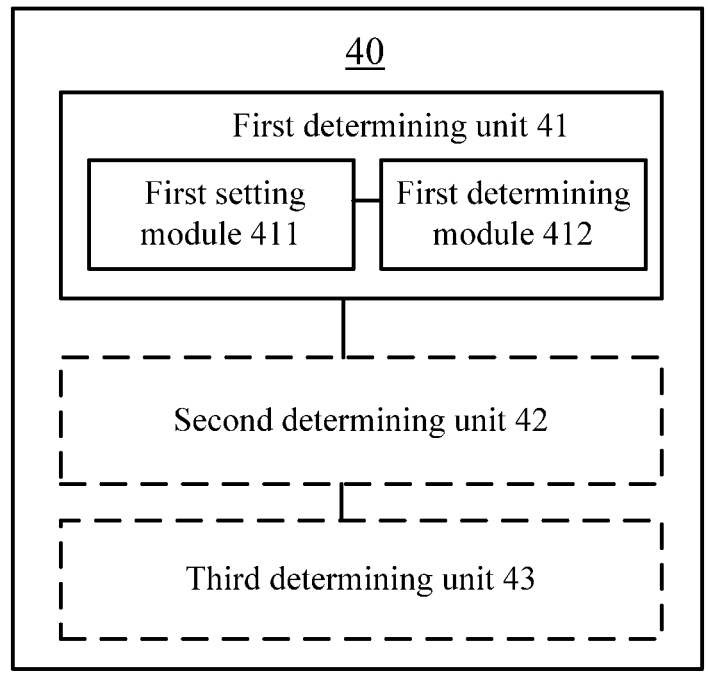
FIG. 4 is a schematic structural diagram of an apparatus for resource management according to an embodiment of the present invention.
Figure 5:
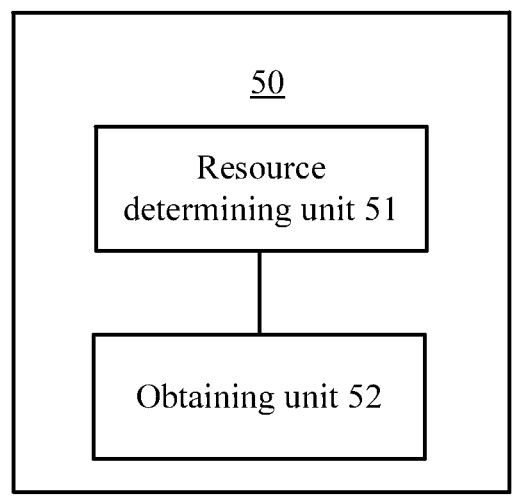
FIG. 5 is a schematic structural diagram of an apparatus for resource management configured on a common UE side according to an embodiment of the present invention.

The following describes a schematic structure of an apparatus for resource management, a low-bandwidth UE, and a common UE according to embodiments of the present invention with reference to FIG. 4 and FIG. 5.

In FIG. 4, an apparatus for resource management 40 includes a first determining unit 41, where the first determining unit 41 is configured to determine, according to a system downlink transmission bandwidth or according to a system downlink transmission bandwidth and a maximum downlink transmission bandwidth of a low-bandwidth UE, a downlink transmission resource configured by a cell for the low-bandwidth UE.

For example, the first determining unit 41 is configured to determine, according to the system downlink transmission bandwidth by means of table lookup, the downlink transmission resource configured by the cell for the low-bandwidth UE.

Alternatively, for example, the first determining unit 41 may include a setting module 411 and a determining module 412, where the setting module 411 is configured to set the maximum downlink transmission bandwidth of the low-bandwidth UE; and the determining module 412 is configured to, when the maximum downlink transmission bandwidth is smaller than the system downlink transmission bandwidth, determine that the downlink transmission resource is a resource of a central part of the system downlink transmission bandwidth.

Specifically, the determining module 412 determines that the number of subcarriers of the resource of the central part of the system downlink transmission bandwidth is equal to the number of subcarriers of the maximum downlink transmission bandwidth, and two sides of the resource of the central part of the system downlink transmission bandwidth are both a half RB, where the maximum downlink transmission bandwidth set by the setting module 411 is an odd number of RBs and the system downlink transmission bandwidth is an even number of RBs, or the maximum downlink transmission bandwidth set by the setting module 411 is an even number of RBs and the system downlink transmission bandwidth is an odd number of RBs.

Optionally, the determining module 412 determines that the number of RBs of the resource of the central part of the system downlink transmission bandwidth is one more than the number of RBs of the maximum downlink transmission bandwidth, where the maximum downlink transmission bandwidth set by the setting module 411 is an odd number of RBs and the system downlink transmission bandwidth is an even number of RBs, or the maximum downlink transmission bandwidth set by the setting module 411 is an even number of RBs and the system downlink transmission bandwidth is an odd number of RBs.

In addition, the apparatus for resource management 40 may further include a second determining unit 42. Before the downlink transmission resource configured by the cell for the low-bandwidth UE is determined according to the system downlink transmission bandwidth and the maximum downlink transmission bandwidth of the low-bandwidth UE, the second determining unit 42 may be configured to determine the maximum downlink transmission bandwidth of the low-bandwidth UE according to the system downlink transmission bandwidth.

The setting module 411 is further configured to select a constant N, and when N is an odd number and the system downlink transmission bandwidth is an odd number of RBs, or N is an even number and the system downlink transmission bandwidth is an even number of RBs, set the maximum downlink transmission bandwidth of the low-bandwidth UE to N RBs, where N is a positive integer. The determining module 412 is further configured to, when the maximum downlink transmission bandwidth is smaller than the system downlink transmission bandwidth, determine that the downlink transmission resource is the resource of the central part of the system downlink transmission bandwidth, where the number of RBs of the resource of the central part of the system downlink transmission bandwidth is equal to the number of RBs of the maximum downlink transmission bandwidth of the low-bandwidth UE.

Optionally, the setting module 411 is further configured to select a constant N, and when N is an odd number and the system downlink transmission bandwidth is an even number of RBs, or N is an even number and the system downlink transmission bandwidth is an odd number of RBs, set the maximum downlink transmission bandwidth of the low-bandwidth UE to (N+1) RBs, where N is a positive integer. The determining module 412 is further configured to, when the system downlink transmission bandwidth is greater than the maximum downlink transmission bandwidth, determine that the downlink transmission resource is the resource of the central part of the system downlink transmission bandwidth, where the number of RBs of the resource of the central part of the system downlink transmission bandwidth is equal to the number of RBs of the maximum downlink transmission bandwidth of the low-bandwidth UE.

In addition, the apparatus for resource management 40 may further include a third determining unit 43 configured to determine that all or a part of the downlink transmission resource is configured for a search space, where the search space is used to transmit downlink control information, and the search space includes a common search space and/or a UE-specific search space.

For example, the third determining unit 43 is configured to determine, by using a cell identifier, that all or a part of the downlink transmission resource is configured for the common search space; or the third determining unit 43 may determine, by using a user equipment identifier or a random access response message, that all or a part of the downlink transmission resource is configured for the UE-specific search space.

Optionally, the first determining unit 41 is further configured to determine, according to a subframe number and/or a system operating mode, the downlink transmission resource configured by the cell for the low-bandwidth UE, where the subframe number is 0, 1, 5, or 6, and the system operating mode is a frequency-division duplexing mode or a time-division duplexing mode.

It may be understood that the apparatus for resource management 40 may be configured in a cell or a base station, or the apparatus for resource management 40 may be configured in a low-bandwidth UE.

In addition, when the apparatus for resource management 40 is configured in the low-bandwidth UE and when the maximum downlink transmission bandwidth is greater than or equal to the system downlink transmission bandwidth, the first determining unit 41 may further determine that the low-bandwidth UE works as a common UE.

In FIG. 5, a common UE 50 includes a resource determining unit 51 and an obtaining unit 52, where the resource determining unit 51 is configured to determine, according to a downlink transmission resource configured by a cell for a low-bandwidth UE, a resource that is configured or scheduled by the cell for the common UE itself and used for transmitting downlink control information or data information; and the obtaining unit 52 is configured to obtain the downlink control information or the data information according to the resource used for transmitting the downlink control information or the data information.

The resource determining unit 51 may be configured to, when two sides of the downlink transmission resource configured by the cell for the low-bandwidth UE each are a half RB, determine that the resource that is configured or scheduled by the cell for the common UE itself and used for transmitting the downlink control information or the data information includes a special RB, where a half RB of the special RB has been configured for the low-bandwidth UE. The obtaining unit 52 may obtain the downlink control information or the data information by using a half RB that is not configured for the low-bandwidth UE in the special RB.

Alternatively, the resource determining unit 51 may be configured to, when two sides of the downlink transmission resource configured by the cell for the low-bandwidth UE each are a half RB, determine that the resource that is configured or scheduled by the cell for the common UE itself and used for transmitting the downlink control information or the data information includes at least one special RB. The obtaining unit 52 may obtain the downlink control information or the data information by combining half RBs that are not configured for the low-bandwidth UE in two of the special RBs.

Alternatively, the resource determining unit 51 may be configured to, when two sides of the downlink transmission resource that is configured by the cell for the low-bandwidth UE each are a half RB, determine that the resource that is configured or scheduled by the cell for the common UE itself and used for transmitting the downlink control information or the data information includes a special RB having the half RB and one or more RBs that are connected to the special RB, where the one or more RBs that are connected to the special RB have been configured for the low-bandwidth UE. The obtaining unit 52 may obtain the downlink control information or the data information by using the special RB.

It can be seen from the foregoing that, with the apparatus for resource management according to the embodiment of the present invention, a low-bandwidth UE and a common UE can coexist on a same frequency band without causing a waste of a dedicated frequency band resource.

It should be understood that a solution described by each claim of the present invention should also be considered as one embodiment, and characteristics in the claims may be combined. For example, a step of a different branch that is performed after a determining step in the present invention may be considered as a different embodiment.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the foregoing described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in the form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A method for resource management, comprising:
   setting a maximum downlink transmission bandwidth of a low-bandwidth user equipment; and
   determining that a downlink transmission resource configured by a cell for the low-bandwidth user equipment is a resource of a central part of a system downlink transmission bandwidth based on a determination that the maximum downlink transmission bandwidth is smaller than the system downlink transmission bandwidth,
   wherein a number of subcarriers of the resource of the central part of the system downlink transmission bandwidth is equal to a number of subcarriers of the maximum downlink transmission bandwidth,
   wherein two sides of the resource of the central part of the system downlink transmission bandwidth are both a half resource block, and
   wherein either the maximum downlink transmission bandwidth is an odd number of resource blocks and the system downlink transmission bandwidth is an even number of resource blocks, or the maximum downlink transmission bandwidth is an even number of resource blocks and the system downlink transmission bandwidth is an odd number of resource blocks.

2. The method according to claim 1, further comprising determining that all or a part of the downlink transmission resource is configured for a search space, wherein the search space is used to transfer downlink control information.

3. The method according to claim 2, wherein the search space comprises a common search space or a user equipment-specific search space.

4. The method according to claim 3, wherein determining that all or a part of the downlink transmission resource is configured for a search space comprises determining, by using a cell identifier, that all or a part of the downlink transmission resource is configured for the common search space.

5. The method according to claim 3, wherein determining that all or the part of the downlink transmission resource is configured for the search space comprises determining, by using a user equipment identifier or a random access response message, that all or the part of the downlink transmission resource is configured for the user equipment-specific search space.

6. The method according to claim 1, wherein the downlink transmission resource configured by the cell for the low-bandwidth user equipment is further determined according to a subframe number or a system operating mode.

7. The method according to claim 6, wherein the subframe number is 0, 1, 5, or 6, and wherein the system operating mode is a frequency-division duplexing mode or a time-division duplexing mode.

8. A method for resource management, comprising:
setting a maximum downlink transmission bandwidth of a low-bandwidth user equipment; and
determining that a downlink transmission resource configured by a cell for the low-bandwidth user equipment is a resource of a central part of a system downlink transmission bandwidth based on a determination that the maximum downlink transmission bandwidth is smaller than the system downlink transmission bandwidth,
wherein a number of resource blocks of the resource of the central part of the system downlink transmission bandwidth is one more than a number of resource blocks of the maximum downlink transmission bandwidth, and
wherein either the maximum downlink transmission bandwidth is an odd number of resource blocks and the system downlink transmission bandwidth is an even number of resource blocks, or the maximum downlink transmission bandwidth is an even number of resource blocks and the system downlink transmission bandwidth is an odd number of resource blocks.

9. The method according to claim 8, further comprising determining that all or a part of the downlink transmission resource is configured for a search space, wherein the search space is used to transfer downlink control information.

10. The method according to claim 9, wherein the search space comprises a common search space or a user equipment-specific search space.

11. The method according to claim 10, wherein determining that all or a part of the downlink transmission resource is configured for a search space comprises determining, by using a cell identifier, that all or a part of the downlink transmission resource is configured for the common search space.

12. The method according to claim 10, wherein determining that all or the part of the downlink transmission resource is configured for the search space comprises determining, by using a user equipment identifier or a random access response message, that all or the part of the downlink transmission resource is configured for the user equipment-specific search space.

13. The method according to claim 8, wherein the downlink transmission resource configured by the cell for the low-bandwidth user equipment is further determined according to a subframe number or a system operating mode.

14. The method according to claim 13, wherein the subframe number is 0, 1, 5, or 6, and wherein the system operating mode is a frequency-division duplexing mode or a time-division duplexing mode.

15. A method for resource management, comprising:
determining a maximum downlink transmission bandwidth of a low-bandwidth user equipment according to a system downlink transmission bandwidth;
setting the maximum downlink transmission bandwidth of the low-bandwidth user equipment; and
determining that a downlink transmission resource configured by a cell for the low-bandwidth user equipment is a resource of a central part of the system downlink transmission bandwidth based on a determination that the maximum downlink transmission bandwidth is smaller than the system downlink transmission bandwidth.

16. The method according to claim 15, wherein determining the downlink transmission resource configured by the cell for the low-bandwidth user equipment comprises:
selecting a constant N;
setting the maximum downlink transmission bandwidth of the low-bandwidth user equipment to N resource blocks, wherein N is a positive integer either based on the determination that N is an odd number and the system downlink transmission bandwidth is an odd number of resource blocks or based on the determination that N is an even number and the system downlink transmission bandwidth is an even number of resource blocks; and
determining that the downlink transmission resource is the resource of the central part of the system downlink transmission bandwidth based on the determination that the maximum downlink transmission bandwidth is smaller than the system downlink transmission bandwidth, wherein a number of resource blocks of the resource of the central part of the system downlink transmission bandwidth is equal to a number of resource blocks of the maximum downlink transmission bandwidth of the low-bandwidth user equipment.

17. The method according to claim 15, wherein determining the downlink transmission resource configured by the cell for the low-bandwidth user equipment comprises:
selecting a constant N;
setting the maximum downlink transmission bandwidth of the low-bandwidth user equipment to (N+1) resource blocks either based on the determination that N is an odd number and the system downlink transmission bandwidth is an even number of resource blocks or based on the determination that N is an even number and the system downlink transmission bandwidth is an odd number of resource blocks, wherein N is a positive integer; and
determining that the downlink transmission resource configured by the cell for the low-bandwidth user equipment is the resource of the central part of the system downlink transmission bandwidth based on the determination that the system downlink transmission bandwidth is greater than the maximum downlink transmission bandwidth, wherein a number of resource blocks of the resource of the central part of the system downlink transmission bandwidth is equal to a number of resource blocks of the maximum downlink transmission bandwidth of the low-bandwidth user equipment.

18. The method according to claim 15, further comprising determining that all or a part of the downlink transmission resource is configured for a search space, wherein the search space is used to transfer downlink control information.

19. The method according to claim 18, wherein the search space comprises a common search space or a user equipment-specific search space.

20. The method according to claim 19, wherein determining that all or a part of the downlink transmission resource is configured for a search space comprises determining, by using a cell identifier, that all or a part of the downlink transmission resource is configured for the common search space.

21. The method according to claim 19, wherein determining that all or the part of the downlink transmission resource is configured for the search space comprises determining, by using a user equipment identifier or a random access response message, that all or the part of the downlink transmission resource is configured for the user equipment-specific search space.

22. The method according to claim 15, wherein the downlink transmission resource configured by the cell for the low-bandwidth user equipment is further determined according to a subframe number or a system operating mode.

23. The method according to claim 22, wherein the subframe number is 0, 1, 5, or 6, and wherein the system operating mode is a frequency-division duplexing mode or a time-division duplexing mode.

* * * * *